US012765471B2

(12) United States Patent
Johnson

(10) Patent No.: US 12,765,471 B2
(45) Date of Patent: Oct. 20, 2026

(54) REMOTE POSITIONING AND CONTROL OF TOOLS

(71) Applicant: Samuel A Johnson, Arvada, CO (US)

(72) Inventor: Samuel A Johnson, Arvada, CO (US)

( * ) Notice: Subject to any disclaimer, the term of this patent is extended or adjusted under 35 U.S.C. 154(b) by 520 days.

(21) Appl. No.: 18/497,130

(22) Filed: Oct. 30, 2023

(65) Prior Publication Data

US 2025/0134006 A1 May 1, 2025

(51) Int. Cl.
*A01G 3/08* (2006.01)

(52) U.S. Cl.
CPC .................................... *A01G 3/086* (2013.01)

(58) Field of Classification Search
CPC .... A01G 3/025; A01G 3/0251; A01G 3/0255; A01G 3/0335; A01G 3/08; A01G 3/081; A01G 3/083; A01G 3/085; A01G 3/086; A01G 3/088; A01G 3/095; A01G 3/0955; A01G 3/097; A01G 2003/023
See application file for complete search history.

(56) References Cited

U.S. PATENT DOCUMENTS 3,317,997 A * 5/1967 Hedstrom .............. A01G 3/065 56/239
4,566,188 A * 1/1986 Wilson ..................... A01G 3/08 30/372
5,634,276 A * 6/1997 Lin ...................... A01G 3/0255 30/249
5,787,536 A * 8/1998 Pate ..................... B25H 1/0028 30/296.1
6,345,445 B1 * 2/2002 Schofield ............... A01G 3/083 30/249
6,901,695 B2 * 6/2005 Lindroth .................. A01G 3/08 83/13
7,987,603 B2 * 8/2011 Pittau ................... A01G 3/0255 30/249
8,046,925 B2 * 11/2011 Wu ...................... A01G 3/0255 30/249
10,368,495 B1 * 8/2019 Wang ..................... A01G 3/081
10,390,493 B2 * 8/2019 Sinyard ..................... B25G 1/04
11,051,458 B2 * 7/2021 Wilson ................... A01G 3/085
2011/0260127 A1 * 10/2011 Surgeon ................... B66D 3/26 254/362
2013/0299046 A1 * 11/2013 Helenius .............. A01G 23/095 144/343
2015/0245564 A1 * 9/2015 D'Acquisto ........... A01G 3/083 30/517
2016/0238082 A1 * 8/2016 Densborn .............. A01G 3/086
2024/0271748 A1 * 8/2024 Swicegood .......... A01K 5/0225

* cited by examiner

*Primary Examiner* — George Sun
(74) *Attorney, Agent, or Firm* — MP Patents, LLC

(57) ABSTRACT

A remote tool positioner includes, configured for mounting near a distal end of a pole having a length, an end effector configured for engaging a workpiece and a tool lift configured for traveling along the length of the pole. The tool positioner may find use as a remote tool positioner and/or be suitable for use in association with a tool positioning system.

18 Claims, 12 Drawing Sheets

REMOTE POSITIONING AND CONTROL OF TOOLS

BACKGROUND

It can be dangerous or even fatal to use tools at great heights or distances. Even at the height of a household stepladder, losing balance and falling, or unstable operation with common tools often results in accidents. Preparing the work site with scaffolds, boom trucks, rigging, work platforms, etc. for the workers, before work can even commence in a safe manner, can be expensive, as this kind of work is usually contracted out to licensed professionals. Tools such as drills, power nail guns, staple guns, wrenches, screwdrivers, scraping and cleaning apparatus, may require operator use from a safe distance.

SUMMARY

The disclosure describes a remote tool positioner, including an end effector adapter configured for mounting to a distal end of a pole having a length extending from a proximal end to the distal end, an end effector configured for mounting to the end effector adapter and engaging a workpiece, a tool lift configured for traveling along the length of the pole and an elongate flexible member configured for hauling the tool lift along the length of the pole.

The disclosure also describes a tool positioning system including a pole, an end effector adapter, an end effector, a tool lift and an elongate flexible member. The pole has a length between proximal and distal ends. The end effector adapter is mounted to a distal end of the pole. The end effector is mounted to the end effector adapter and is configured to engage a workpiece. The tool lift is mounted to the pole and is configured for traveling along a length thereof. The elongate flexible member is threaded through the end effector adapter and tethered to the tool lift.

Further, the disclosure describes a tool positioner including, configured for mounting near a distal end of a pole having a length, an end effector configured for engaging a workpiece and a tool lift configured for traveling along the length of the pole.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those having ordinary skill the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

Figure 1:
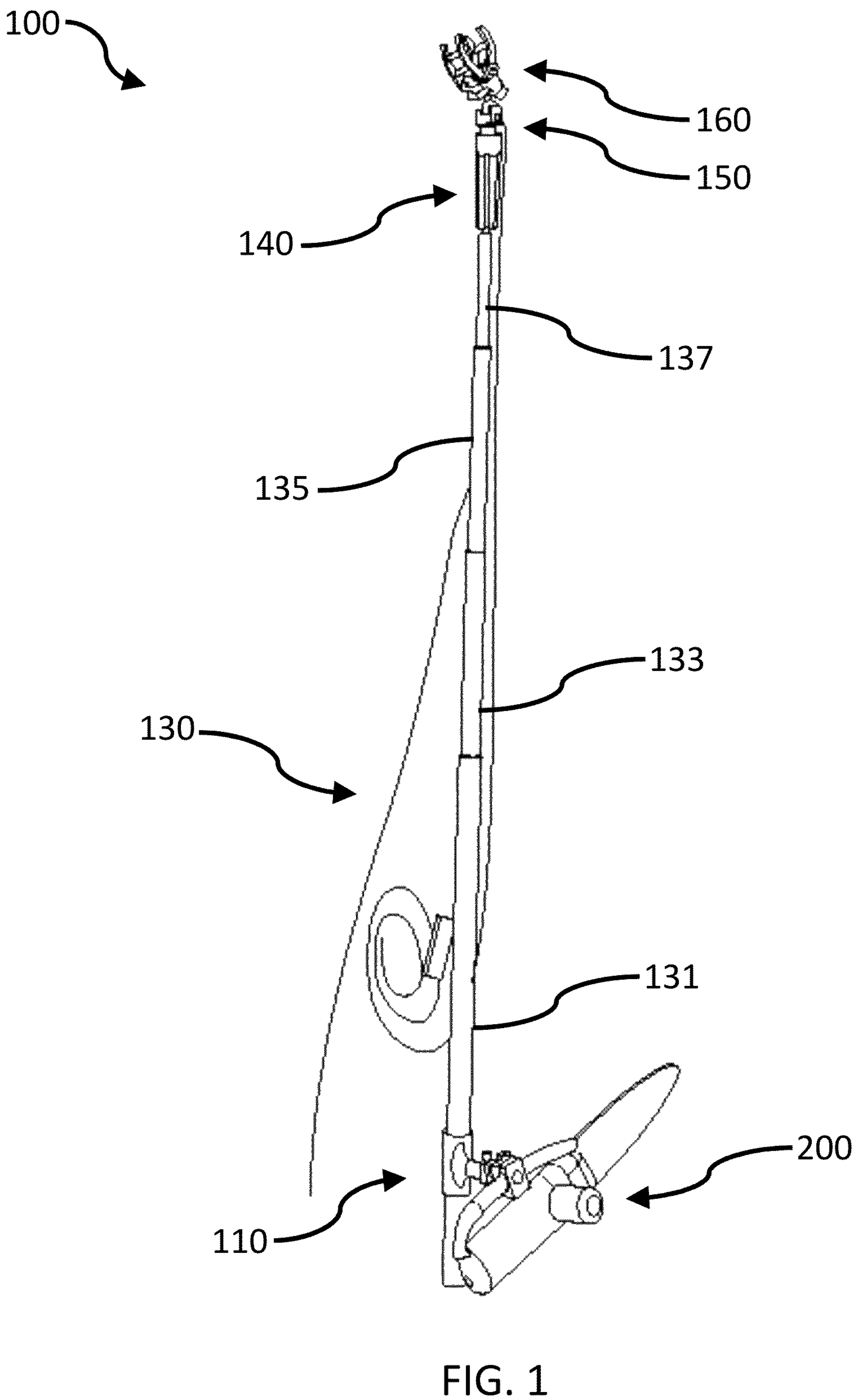
FIG. 1 illustrates a perspective overview of an example tool positioning system.
Figure 2:
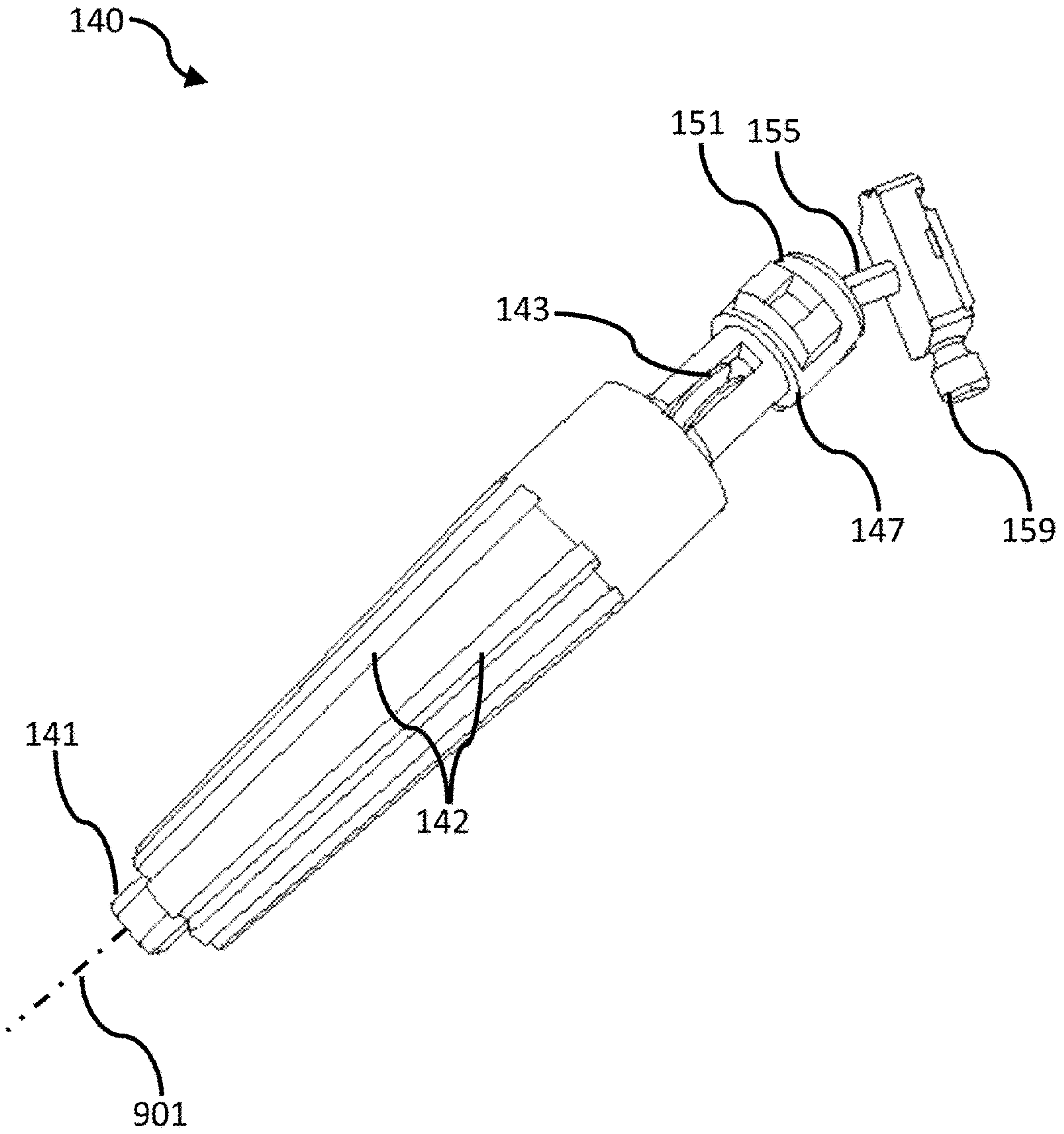
FIG. 2 illustrates a perspective view of an example end effector adapter suitable for use in association with disclosed tool positioning systems.
Figure 3:
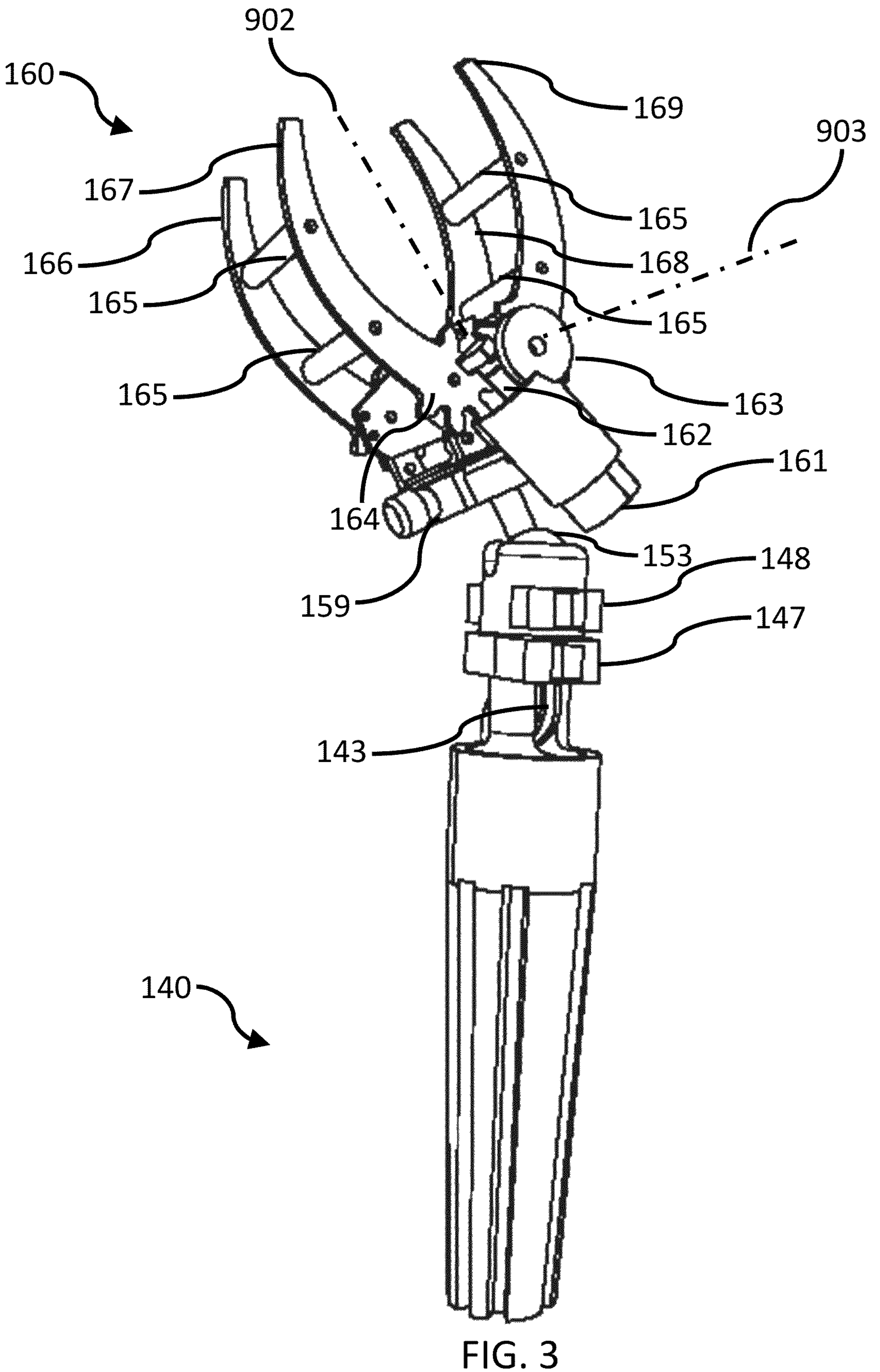
FIG. 3 illustrates a perspective view of an example end effector provided to an end effector adapter, the combination being suitable for use in association with disclosed tool positioning systems.
Figure 4:
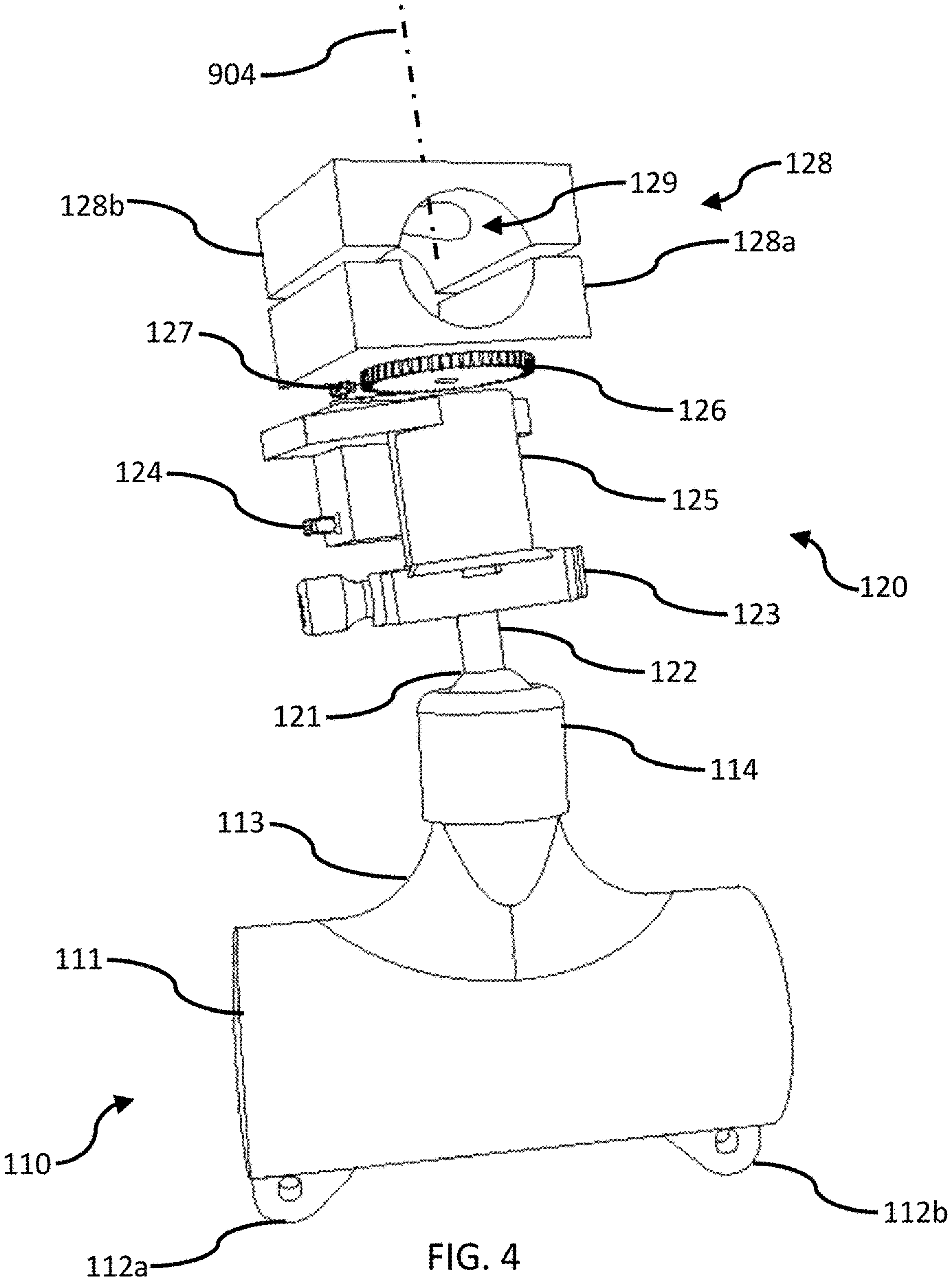
FIG. 4 illustrates a perspective view of an example tool lift suitable for use in association with disclosed tool positioning systems.
Figure 5:
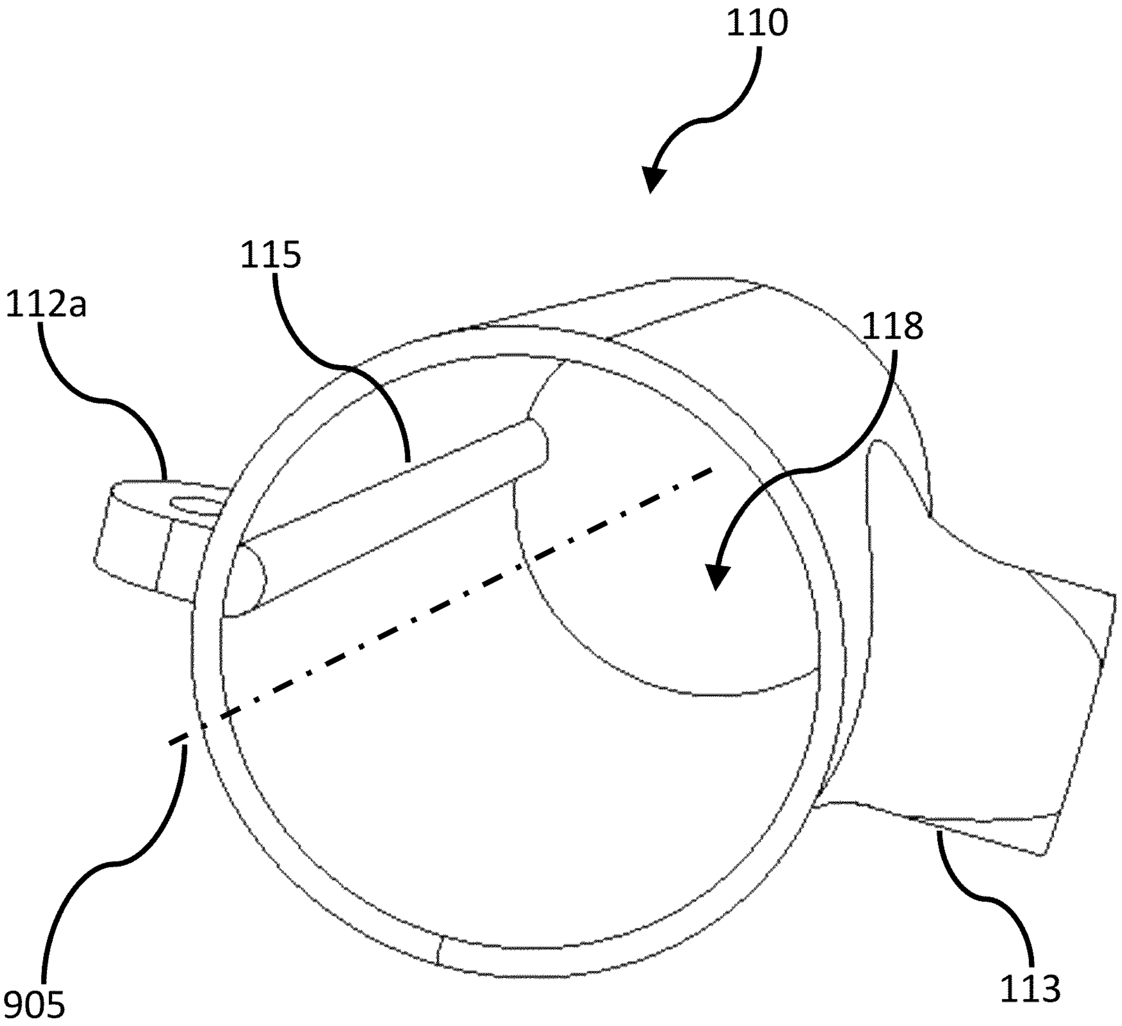
FIG. 5 illustrates a perspective view of an example sleeve suitable for use in association with the tool lift of FIG. 4.
Figure 7A:
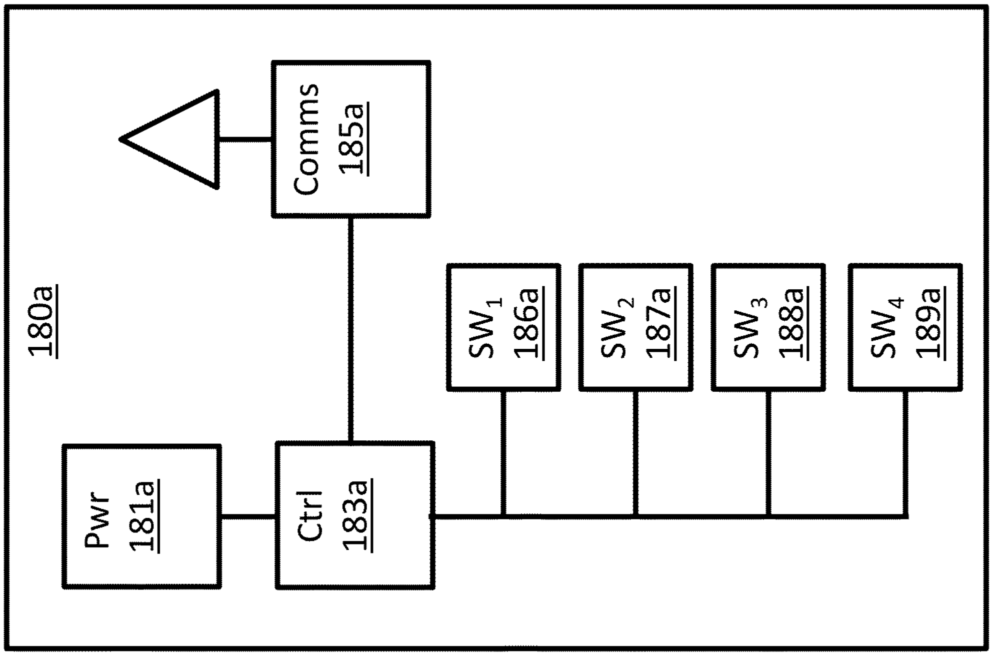
FIG. 7A schematically illustrates example electrical functional components of an embodiment of a remote controller suitable for use in association with disclosed tool positioning systems.
Figure 6:
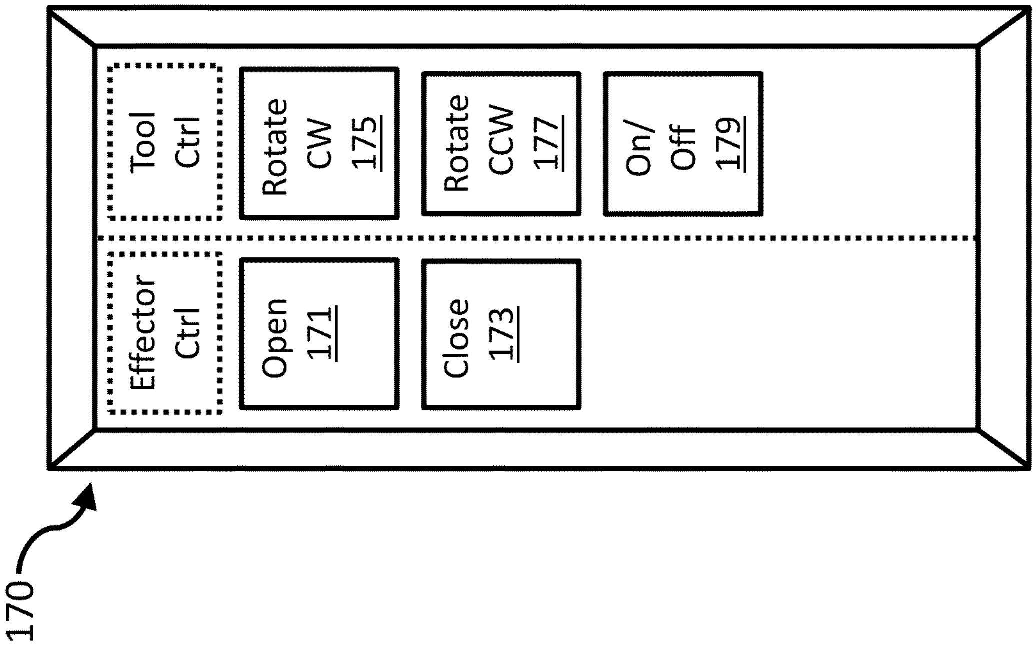
FIG. 6 illustrates an example remote controller suitable for use in association with disclosed tool positioning systems.
Figure 7B:
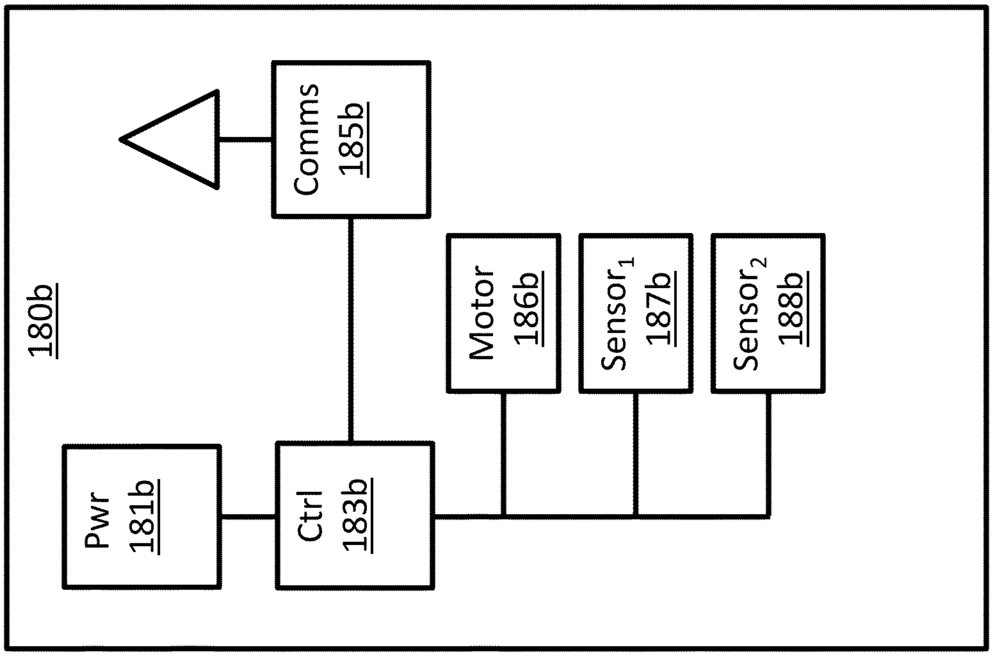
FIG. 7B schematically illustrates example electrical functional components of an embodiment of a remote controller suitable for use in association with disclosed positioning systems.
Figure 7C:
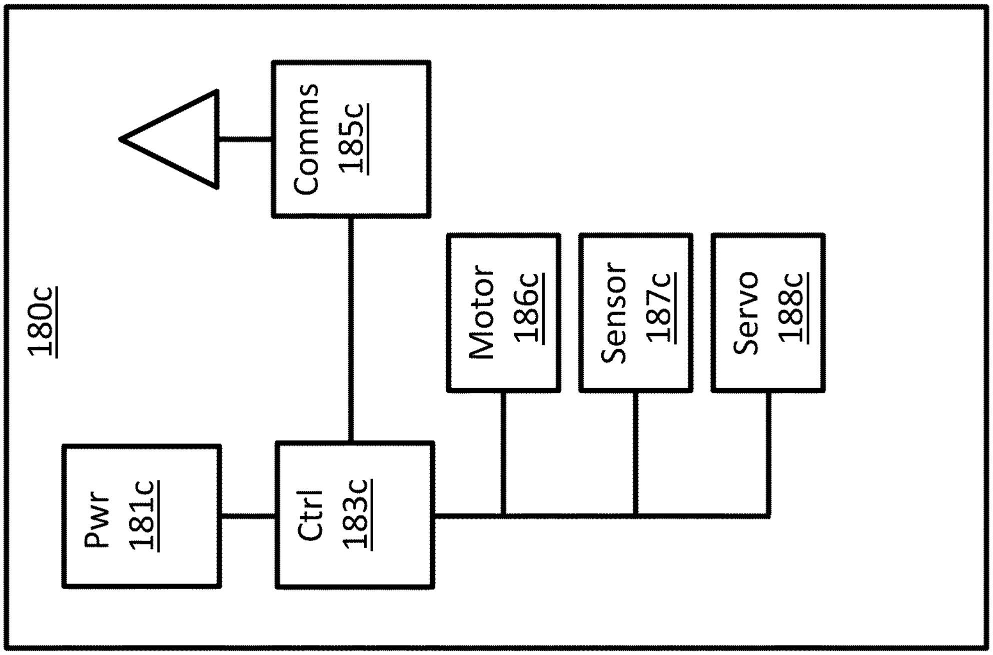
FIG. 7C schematically illustrates example electrical functional components of an embodiment of a remote controller suitable for use in association with disclosed tool positioning systems.
Figure 8:
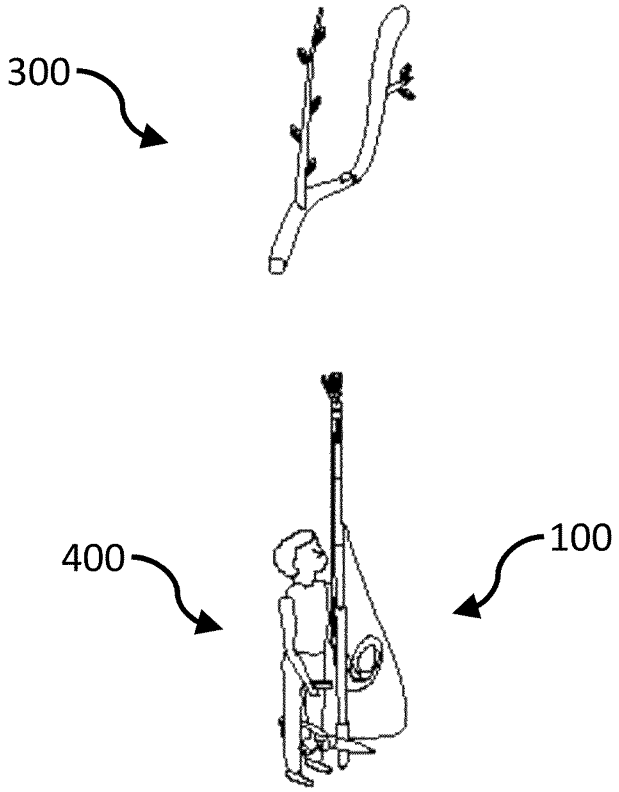
FIG. 8 illustrates a perspective view of an example operator with an example tool positioning system prior to deployment to an example workpiece.

The following detailed description illustrates embodiments of the present disclosure and manners by which they can be implemented. Although the best mode of carrying out the present disclosure has been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Known pole-mounted gas and electric chain saws useful for trimming trees are only usable at relatively short distances, 3m maximum. Such saws weigh between 3-6 kg and, when lifted from a horizontal position, may resist rotation with a moment equal to the product of 3 meters and 6 kg which is 18 kg-m. It may be possible for a physically fit operator to generate such a moment by exerting 18 kg of force from each hand with the hands spaced by 1m. However, should a pole extending 10m, 15m or 20m be provided, use could not be considered by even a team of people. Additionally, flexion of such a long pole would be severe, and potentially uncontrollable even when raised to a near vertical position where the moment due the weight would be minimal.

A variant of a powered pole is to replace the heavy powered chain saw with a lightweight serrated blade. These are also common and popular and may extend to 6-7m high. However, the operator must reciprocate the handle in a sawing motion, which can be very tiring and imprecise.

Disclosed embodiments overcome the limitations of short-range pole-mounted tools enabling vertical pole lengths of 10-20 m. Because the tool can be deployed to the worksite elevation after the distal end of a lightweight telescoping or segmented pole has been raised and attached to the worksite or workpiece, the moment needing to be overcome by the operator is significantly reduced.

Additional aspects, advantages, features and objects of the present disclosure will be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

While disclosed embodiments are described in the context of remote operation of saws commonly used to trim tree branches, cut wood, cut brush, etc, they may find effective use in deploying other types of tools.

FIGS. 1-7 illustrate an example tool positioning system 100 which may be suitable for remote positioning and control of tools. Tool positioning system 100 includes an end effector adapter 140/150, an end effector 160, a tool lift 110/120 and an elongate flexible member 144 each suitable for use in association with a pole 130.

End effector adapter 140/150 (FIG. 2) is configured for mounting to a distal end of a pole. End effector 160 (FIG. 3) is configured for engaging a workpiece and for mounting near a distal end of a pole 130, for example, by way of end effector adapter 140/150. Tool lift 110/120 (FIG. 3), configured for supporting a tool, is also configured for mounting to and traveling along a length of the pole to thereby move a supported tool. Elongate flexible member 144 (FIG. 1) is threaded through end effector adapter 140/150 and is configured to haul the tool lift along the length of the pole.

A pole 130 suitable for use in association with disclosed remote tool positioning components may be provided with other components or separately. Pole 130 defines a length between proximal and distal ends and may be comprised of a number of segments 131, 133, 135 and 137. The segments may be arranged for telescoping and relative sliding. Alternatively, the segments may be of locking design with each segment being nearly equal in diameter. Locking segment design poles are screwed into one another to make a single long pole. Poles of either variety as well as suitable others not specifically listed herein may be constructed from any of a variety of strong, light-weight materials. In an example, fiberglass or extruded aluminum are used for poles up to 10m in deployed length while medium-to-high modulus carbon-fiber construction is used for poles exceeding 15 to 20 m.

End effector adapter 140/150, which may define a longitudinal axis 901, is configured for mounting to a distal end of a pole such as pole 130. As an example, end effector adapter 140/150, by way of coupler 141, may thread onto standard ¾ in-4G Acme screw threads often provided to ends of deployable poles such as those described by way of example above. In another example, coupler 141 may attach to a pole by press fit. End effector adapter 140/150 includes means for aligning tool lift 110/120 with end effector adapter 140/150 and/or the work piece (for example, limb 300). In an example, end effector adapter 140/150 includes a plurality of external splines 142 configured for engagement by an internal spline provided to tool lift 110/120.

End effector adapter 140/150 may include proximal 140 and distal 150 portions relatively rotatable against an aligning torque about longitudinal axis 901 to thereby form a swivel joint. In an example, the aligning torque is supplied by a first magnet assembly 147 provided to proximal portion 140 of end effector adapter 140/150 and a second magnet assembly 157 provided to distal portion 150 of end effector adapter 140/150 with aligned North and South poles to thereby form a magnetically aligned swivel joint. First and second magnet assemblies 147 and 148, which may each include one or multiple individual magnets, may be provided to pockets formed in the end effector adapter 140/150. With the small alignment torque when first approaching the desired work piece with the end effector 160 in a receptive state, end effector adapter 140/150 and end effector 160 may be easily rotated by simply rotating the pole handle.

Distal portion 150 of end effector adapter 140/150 may include a repositionable locking ball joint having a socket 151 for grasping a ball 153 (FIG. 3) with a neck 155 extending therefrom to which is mounted an effector platform 159. End effector adapter 140/150 may further include a pulley sheave 143 with a rotational axis transverse to longitudinal axis 901 or length of end effector adapter 140/150 and/or pole 130 to which end effector adapter 140/150 is provided. Pulley sheave 143 is configured to guide, support and change direction of elongate flexible member 144.

End effector adapter 140/150 may take any of a variety of shapes suitable for indirectly coupling an end effector to a pole at a desired alignment including but not limited to conical or frustoconical.

End effector 160 is configured for mounting to end effector adapter 140/150 to engage a workpiece. End effector 160 may further include gripping means. In an example, such gripping means includes a pair of gripping jaws. Each gripping jaw may be formed from two of jaw members 166, 167, 168, 169 which each extend from what might be considered a wrist, ramus or base to a distal tip.

Several gear teeth, such as involute gear teeth 164, may be formed at the base of each jaw member 166, 167, 168, 169. Stand-offs 165 maintain jaw members of jaw member pairs spaced apart. The first pair of jaw members 168, 169, associated stand-offs 165 and a worm gear 163 may form one rigid assembly configured for rotation about axis 903 by driving of worm gear 163 by worm 162 rotated by motor 161. The second pair of jaw members 166, 167 and associated stand-offs 165 may similarly form one rigid assembly configured for rotation about an axis parallel with 903.

Worm 162 is attached to the armature shaft of motor 161 such that rotation of worm 162 about a first axis 902 is configured to drive worm gear 163 to rotate about a second, perpendicular axis 903 and, by a torque transmitted to one of the jaw members 166, 167, 168, 169, pivot a first pair thereof (for example, 168, 169) inward or towards a closed state. Second pair of jaw members 166, 167 pivots towards or away from the first pair in response to pivoting of first pair 168, 169 by way of meshing of involute gear teeth 164 of respective jaw members of the cooperating pair.

Worm gearing may enable a self-locking feature when stopped, thus requiring no power in the locked, or clamped position on a workpiece. Control receiver electronics and a small power source such as a battery (not visible) may be located within end effector 160. Motor 161, and thereby end effector 160, may be activated by remote control.

Jaw members 166, 167, 168 and 169 as well as stand-offs 165 may be formed from any of a variety of durable, lightweight materials including but not limited to thin metal, such as aluminum, or molded reinforced plastic. In an example, motor 161 takes the form of a DC motor.

While shown and described by way of example as a conventional jawed gripper, end effector 160 could take any of a variety of forms. In one example, for attachment to ferrous metal structure, an electromagnet or other magnetically actuated device could be provided. In another example, for other surfaces, a flat or curved pad onto which adhesive or hot melt glue is dispensed could be provided such that, upon contact, a firm, but removable, bond is made. In yet another example, for planar wood surfaces, a robotic attachment device using anchoring screws for the attachment mode could be deployed.

Tool lift 110/120 is configured for mounting to a pole 130 for traveling along the length thereof. Tool lift 110/120 may further include a tube or sleeve 110 configured to encompass the pole with a lumen 119 and slide therealong as well as a tool arm 120.

Tool lift 110/120 may further include a socket 113 provided to sleeve 110 and configured for receiving and/or encompassing a ball 121 of tool arm 120 to provide for a locking positional joint. Socket cap 114 contains ball 121 within socket 113. The provision of such a joint allows the operator to achieve the desired angle of attack when using the tool by roughly aligning tool lift 110/120 to tool 200 before raising into the final, distal position. Robotic actuators may be added to this locking positional joint 113/114/121 to adjust the degrees of freedom once the tool is lifted. A tool platform 123 is mounted to neck 122 extending from ball 121.

Holders of various shapes and/or sizes may accommodate the chosen tool. In an example, tool arm 120 has a tube clamp 128 including an expandable compound bearing surface comprised of first 128*a* and second 128*b* clamp blocks. Bearing surface 129 defines a central axis rotatable within a plane parallel with the length of the pole. Tube clamp 128 is configured to hold some aspect of tool 200 to be used. As an example, tube clamp 128 could be attached to the chain saw handle which would normally be grasped by a human hand for operation. Bearing surface 129 of clamp blocks 128*a* and 128*b* may be shaped to closely conform to the tool handle, for example, as a human hand would. Rotating the tool about the handle being gripped can be remotely achieved by providing for clamp blocks 128*a* and 128*b* to rotate about an axis 904.

Tube clamp 128 may be configured for controlled rotation about an axis transverse or oblique to both the length of the pole and a central axis 905 of the sleeve 110. In an example, tube clamp 128 may be configured for motorized rotation about an axis 904. A large spur gear 126 rigidly attached to clamp block 128*a* is driven by small spur gear 127 attached to an output of a geared servo motor 124 such as the commonly available RC servo motor. Adapter plate 125 carries the pivoting shaft, geared servo motor 124 and small spur gear 127, and is attached to and supported by tool platform 123. For example, a motor 124 may be provided to rotate tube clamp 128 about axis 904. A larger diameter spur gear 126 fixed to a bottom surface of tube clamp 128*a* may be driven by a small diameter spur gear 127 rotated by motor 124. The remote tool positioner may further include a remote controller for activating the motor.

An internal alignment guide 115 is formed in tool lift 110/120 such that, when lifted into engagement with alignment features 142 of end effector adapter 140/150, operator 400 can exert considerable torque in rotating the tool while working. In an example, internal alignment guide 115 is an internal spline configured for engagement with splines of end effector adapter 140/150.

The tool lift may further include an anchor point for elongate flexible member 144. In an example, the anchor point is an eyelet 112*a*, 112*b*. In another example, the anchor point is a hook (not shown). Considering most portable, battery-powered electric tools, have a weight of approximately 1-6 kg, the weight of tool lift 110/120 is considered negligible at 200-300*g*.

Elongate flexible member 144 may be threaded through end effector adapter 140/150 and tethered or anchored to tool lift 110/120 at one end while a second end is available for grasping by an operator for hauling tool lift 110/120 and any supported tool along the length of the pole 130 to a top locking position after end effector 160 has firmly and solidly attached itself to the chosen workpiece. In an example, elongate flexible member 144 runs through and around a pulley sheave 143 located within end effector adapter 140/150 and is attached to tool lift 110/120 at one or both of anchor points 112*a*, 112*b*. In a further example, the pulley sheave is a low-friction variety.

A cleat or hook may be provided to secure the operator end of elongate flexible member 144 to hold the tool in an elevated position along the length of the pole. Alternatively, a latch/release mechanism may be fitted between tool lift sleeve 111 and end effector adapter 140/150, so that a first hard tug of elongate flexible member 144 latches and a second hard tug releases the tools lift sleeve 111. In yet another alternative, a ball detent or an electrical latch release mechanism be could fitted to the pole, end effector adaptor 140/150 and/or tool lift 110/120.

A hand-held remote controller 170 (FIG. 6) may be provided for controlled operation of each of end effector 160, tool lift 110/120 and tool 200. Once end effector 160 is in the correct position to attach, a 'CLOSE' or 'GRIP' button 173 may be pressed to actuate end effector 160, for example, to grasp a workpiece such as a tree branch 300. Control features for tool rotation by tool lift 110/120 may be located on the right side of remote controller 170. In an example, buttons 175 and 177 control the direction of motor 124. An ON/OFF button 179 may toggle the power of tool 200.

One or more of any of a variety of control hardware arrangements may reside within remote controller 170. First example control hardware arrangement 180*a* (FIG. 7A) includes a small battery 181*a* as a power source, a logic controller 183*a*, various interface buttons 186*a*, 187*a*, 188*a*, 189*a* for control of end effector 160, of tool lift 110/120, and those tools and actuators attached thereto. A communications device 185*a* is also provided, which could be a low-cost radio frequency module, such as Bluetooth, Wi-Fi, or ISM radios in the 405 and 900 Mhz regions. In a further example, communications device 185*a* may be ultra-sonic, or IR controlled, since distances between devices will normally be short. Logic controller 180*a* may be of either analog or digital construction, or a combination of both.

A second control hardware arrangement 180*b* (FIG. 7B) includes a small battery 181*b* as a power source, a logic controller 183*b*, and various sensors and actuators 186*b*, 187*b*, 188*b* for reading and writing to. Motor 186*b* may provide the end effector motor 161, to open and close jaws 166, 167, 168 and 169 in the preferred embodiment. Sensors 187*b*, 188*b* might be reactive to force, accelerometer, quaternion angles, etc.

A third control hardware arrangement 180*c* (FIG. 7C) includes a small battery 181*c* as a power source, a logic controller 183*c*, and various sensors and actuators 186*c*, 187*c*, 188*c* for reading and writing to. Motor 186*c* and servo 188*c* may provide the tool actuation angle, tool ON/OFF commands, etc. Sensor 187*c* might be reactive to force, accelerometer, quaternion angles, etc.

Additionally, any of the first 180*a*, second 180*b* and/or third 180*c* control hardware may pre-programmed to only allow tool deployment and/or operation after successful gripping or attachment parameters have been met, or only after proper setup.

Described positioners and positioning systems may be suitable for use in association with any of a variety of methods for positioning, operating and/or controlling a tool. According to an example method illustrated by way of example in FIGS. 8-13, an end effector configured to engage a workpiece is mounted to an end effector adapter, the end effector adapter is mounted to a distal end of a pole having a length between proximal and distal ends, a tool lift configured for traveling along a length of the pole is mounted to the pole and an elongate flexible member is threaded through the end effector adapter and tethered to the tool lift.

The tool lift may be mounted by slidably encompassing the pole with a sleeve portion of the tool lift. A relative angle between the sleeve and a tool arm extending therefrom may be adjusted with a ball-and-socket joint. A compound bearing surface of a tube clamp of the tool arm may be sufficiently expanded to receive a tool handle for gripping of the same.

The elongate flexible member may be threaded through the end effector adapter by guiding and supporting the elongate flexible member with a pulley sheave having a rotational axis transverse to the length of the pole. The elongate flexible member may be tethered to the tool lift by attaching to an anchor point.

Before the pole is deployed, the end effector is positioned on the ground with respect to three axes of rotation to an approximate measure based on the position of the operator 400, any objects obstructing the workpiece, and the best angle of attachment to the workpiece. Positioning may be achieved by, for example, one or more rotations of a ball-and-socket joint.

Figure 9:
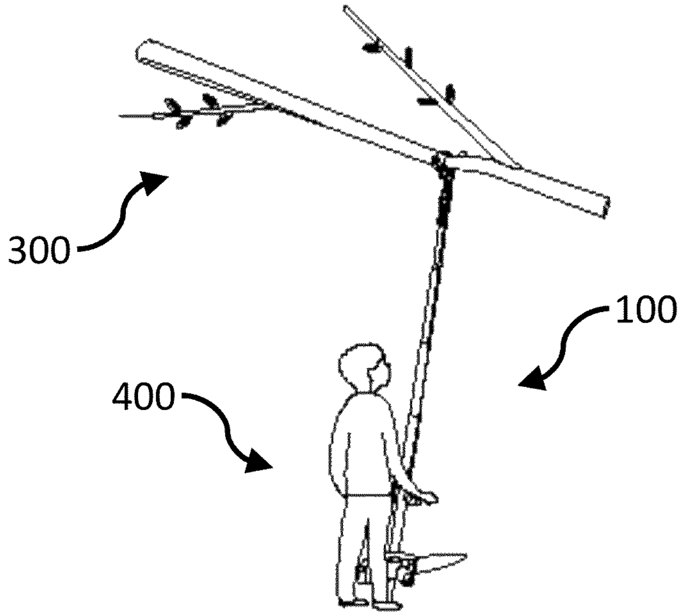
FIG. 9 illustrates a perspective view of an example operator with an example end effector grasping a workpiece.
Figure 10:
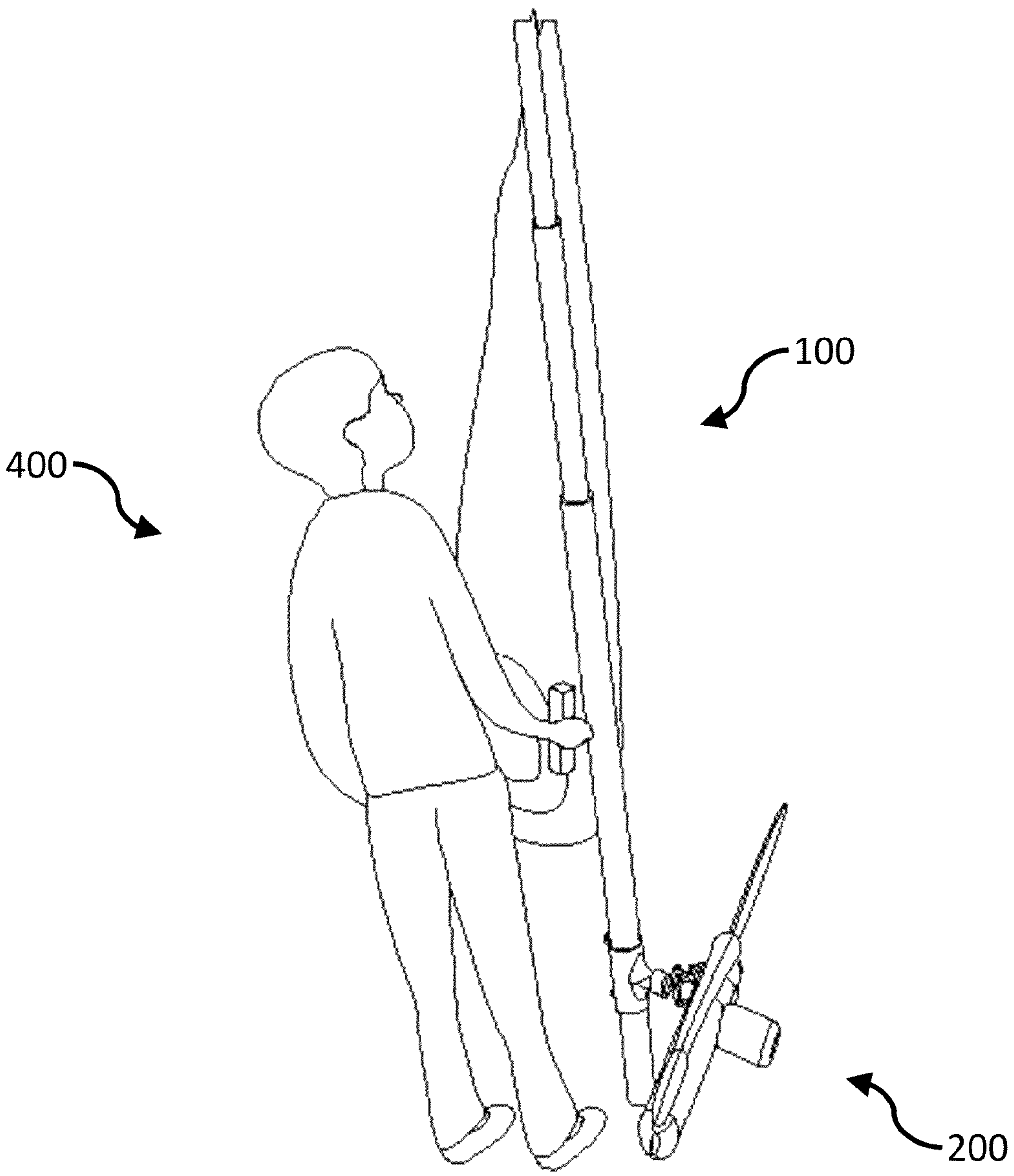
FIG. 10 illustrates an example operator engaging an example remote controller.

The pole is positioned so the end effector is in capture range of a workpiece, such as a tree limb 300. This may require the operator 400 to rotate the pole to rotate the end effector. Proximal and distal portions of the end effector adapter may remain aligned at a swivel joint due to an aligning torque about a longitudinal axis of the end effector adapter. The aligning torque may be supplied with a first magnet assembly provided to a proximal portion of the end effector adapter and a second magnet assembly provided to a distal portion of the end effector adapter. Referring to FIG. 9, a pole and end effector have been positioned to attach onto the work piece 300. For example, the work piece is engaged by gripping the work piece with a pair of jaws actuated by a motor energized with a remote controller held by the operator (FIG. 10).

The tool, attached to a tool lift, remains near ground level until positive attachment of end effector is secured. By maneuvering the deployable pole before positioning the tool, the weight of tool may act to counterbalance the moment of extensible pole and the end effector, as the operator would be holding onto the pole at some positions located along the length.

Figure 11:
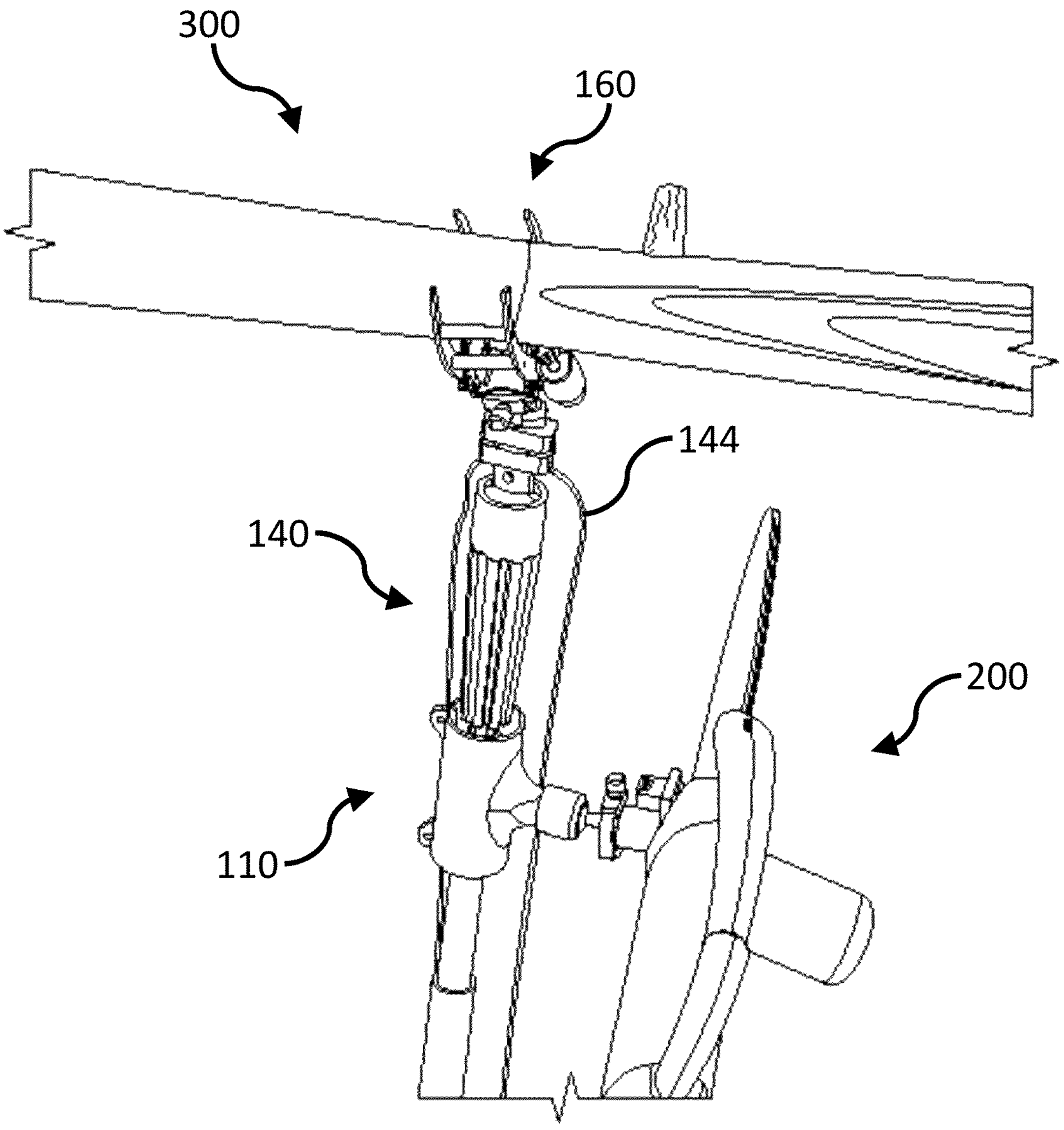
FIG. 11 illustrates a perspective view of an example tool lift and tool just before being solidly positioned to the distal end of the tool positioning system.

After the deployable pole and its associated end effector are firmly locked onto the workpiece, the operator can pull the free end of the elongate flexible member to raise the tool assembly to the top of pole and a slidable fit in an alignment with the end effector adapter (FIG. 11). For example, two or more of a plurality of splines of the end effector adapter are engaged with a spline provided to the tool lift, or alternatively, a spline of the tool lift is engaged with two or more splines of the end effector adapter.

The tool rotational angle about the pole axis can also be adjusted. Proximal and distal portions of the end effector adapter may be relatively rotated about a longitudinal axis of the end effector adapter and against the aligning torque. Since the magnets exert little rotational force, the operator would not notice the torque needed to rotationally turn the handle to thus position the tool.

Figure 12:
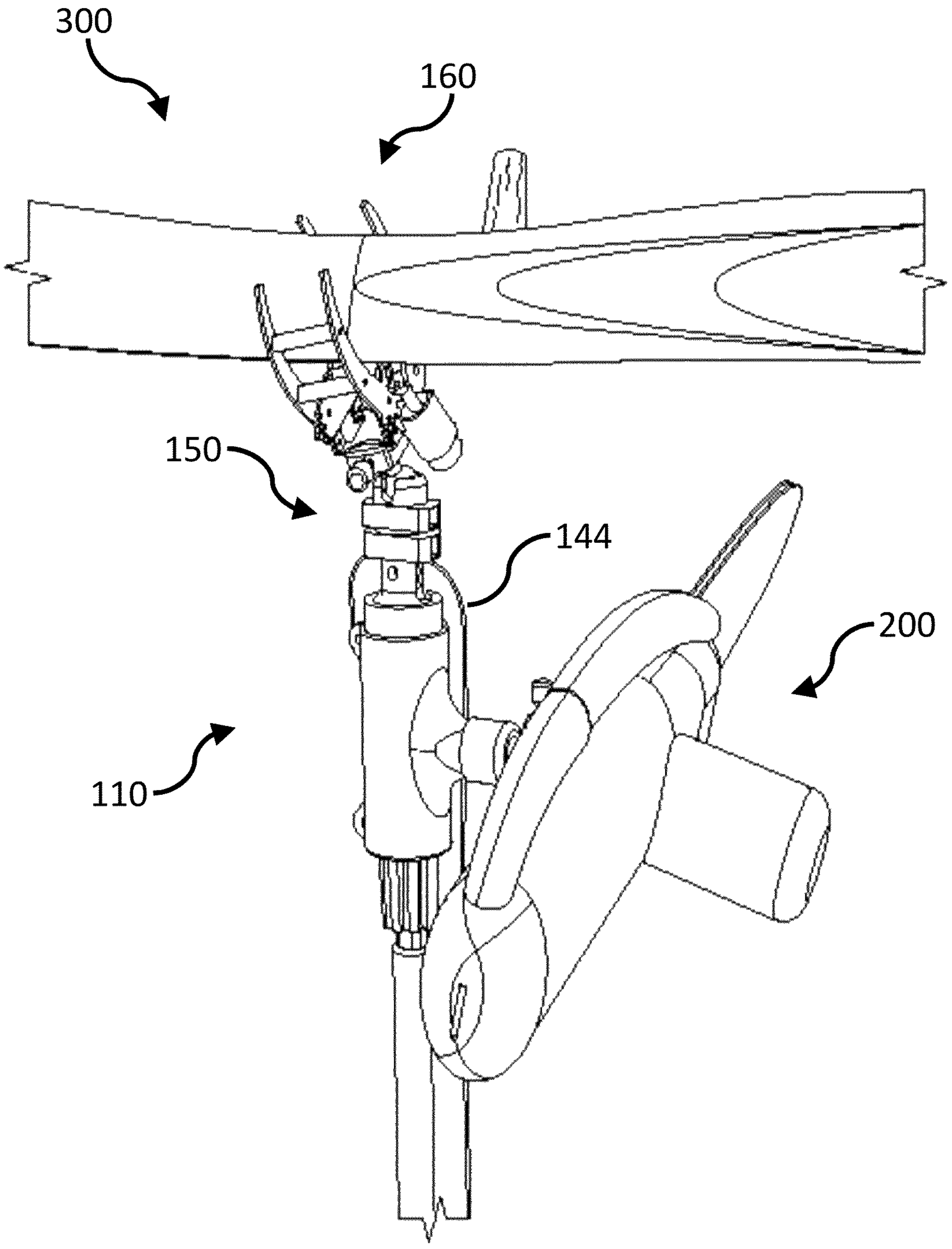
FIG. 12 illustrates a perspective view of an example tool lift and tool just after being solidly positioned to the distal end of the tool positioning system.

The rotational angle between the tube clamp of the tool arm and the sleeve may be adjusted about an axis transverse to the length of the pole and a central axis of the sleeve (FIG. 12). The tube clamp may be rotated with a motor energized with a remote controller.

Figure 13:
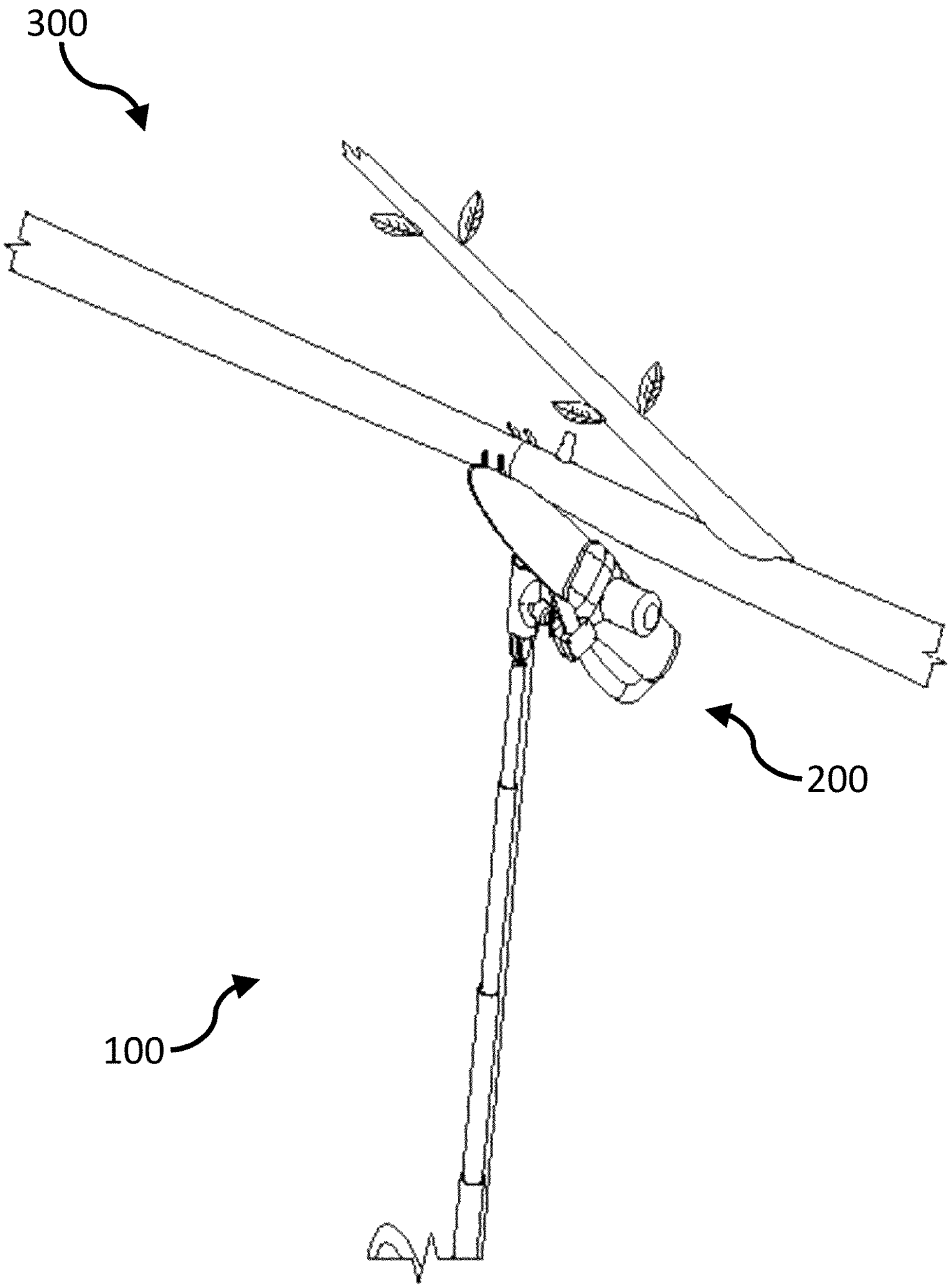
FIG. 13 illustrates a perspective view of the distal end of an example tool positioning system after remote control and manual adjustments have been made to the tool angles.

Referring to FIG. 13, tool 200 is now rotated from its lifting orientation to the desired working orientation via a remotely controlled servo or geared motor from a remote controller. Finally, the tool can be energized to apply the work to the workpiece.

Once the work piece has received the work, the tool may be inactivated, the tool lift lowered to near the proximal end of the pole, the end effector may be disengaged from the work piece and the distal end of the pole may be relocated to address a new work piece or lowered to conclude use.

The actions are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, enabling users to reduce dangerous situations of using tools at a remote distance.

Modifications to embodiments of the present disclosure described in the foregoing are possible without departing from the scope of the present disclosure as defined by the accompanying claims. Expressions such as “including”, “comprising”, “incorporating”, “consisting of”, “have”, “is” used to describe and claim the present disclosure are intended to be construed in a non-exclusive manner, namely allowing for items, components or elements not explicitly described also to be present. Reference to the singular is also to be construed to relate to the plural.

What is claimed is:

1. A remote tool positioner, comprising:

an end effector adapter configured for mounting to a distal end of a pole having a length extending from a proximal end to the distal end;

an end effector configured for mounting to the end effector adapter and engaging a workpiece;

a tool lift configured for traveling along the length of the pole; and an elongate flexible member configured for hauling the tool lift along the length of the pole;

wherein the tool lift further comprises a sleeve having a socket and a tool arm including a ball encompassed by the socket and having a neck extending therefrom to which is mounted a lift support.

2. The remote tool positioner as set forth in claim 1, wherein the end effector adapter includes means for aligning the tool lift.

3. The remote tool positioner as set forth in claim 1, wherein the end effector adapter defines a longitudinal axis and includes proximal and distal portions relatively rotatable against an aligning torque about the longitudinal axis.

4. The remote tool positioner as set forth in claim 1, wherein the end effector adapter defines a longitudinal axis and includes a pulley sheave with a rotational axis transverse to the longitudinal axis which is configured to guide, support and change direction of the elongate flexible member.

5. The remote tool positioner as set forth in claim 1, wherein the end effector further comprises gripping means.

6. The remote tool positioner as set forth in claim 1, wherein the tool lift further comprises a sleeve configured to encompass the pole and slide therealong.

7. The remote tool positioner as set forth in claim 1, wherein the tool lift further comprises a tool arm having a tube clamp configured for controlled rotation about an axis transverse to the length of the pole.

8. The remote tool positioner as set forth in claim 1, wherein the tool lift further comprises an anchor point for the elongate flexible member.

9. The remote tool positioner as set forth in claim 1, wherein the tool arm is further coupled to the sleeve by a ball-and-socket joint.

10. The remote tool positioner as set forth in claim 9, wherein the tool arm further comprises a tube clamp.

11. The remote tool positioner as set forth in claim 10, wherein the tube clamp is configured for controlled rotation about an axis transverse to a central axis of the sleeve.

12. The remote tool positioner as set forth in claim 11, further comprising a large diameter spur gear fixed to a bottom surface of the tube clamp and driven by a small diameter spur gear rotated by a motor.

13. A tool positioning system, comprising:

a pole having a length between proximal and distal ends;

an end effector adapter mounted to a distal end of the pole;

an end effector, configured to engage a workpiece and mounted to the end effector adapter;

a tool lift mounted to the pole and configured for traveling along a length thereof; and an elongate flexible member threaded through the end effector adapter and tethered to the tool lift;

wherein the tool lift further comprises a sleeve having a socket and a tool arm including a ball encompassed by the socket and having a neck extending therefrom to which is mounted a lift support.

14. The system as set forth in claim 13, wherein the end effector adapter defines a longitudinal axis and includes proximal and distal portions relatively rotatable against an aligning torque about the longitudinal axis.

15. The system as set forth in claim 14, wherein the distal portion includes a socket grasping a ball having a neck extending therefrom to which is mounted an effector support.

16. The system as set forth in claim 13, wherein the tool arm is further coupled to the sleeve by a ball-and-socket joint.

17. The system as set forth in claim 16, wherein the tool arm further comprises a tube clamp.

18. The system as set forth in claim 13, wherein the tool lift further comprises an anchor point for the elongate flexible member.

* * * * *